United States Patent
Kuo et al.

(10) Patent No.: US 12,451,931 B2
(45) Date of Patent: Oct. 21, 2025

(54) SYSTEM AND METHOD FOR AUTOMATICALLY ADJUSTING BEAM DIRECTION OF REFLECTOR

(71) Applicant: FAR EASTONE TELECOMMUNICATIONS CO., LTD., Taipei (TW)

(72) Inventors: Chun-Chieh Kuo, New Taipei (TW); Hua-Pei Chiang, Taipei (TW); Chyi-Dar Jang, Taipei (TW); Chi-Hung Lin, New Taipei (TW); Tsung-Jen Wang, Taipei (TW); Che-Yu Liao, Taipei (TW); Chi-En Chien, New Taipei (TW); Hao Chen, New Taipei (TW)

(73) Assignee: FAR EASTONE TELECOMMUNICATIONS CO., LTD., Taipei (TW)

( * ) Notice: Subject to any disclaimer, the term of this patent is extended or adjusted under 35 U.S.C. 154(b) by 6 days.

(21) Appl. No.: 18/646,335

(22) Filed: Apr. 25, 2024

(65) Prior Publication Data
US 2025/0253893 A1    Aug. 7, 2025

(30) Foreign Application Priority Data
Feb. 5, 2024   (TW) .................. 113104537

(51) Int. Cl.
*H04B 7/04*   (2017.01)
*H01Q 3/02*   (2006.01)

(52) U.S. Cl.
CPC .......... *H04B 7/04013* (2023.05); *H01Q 3/02* (2013.01)

(58) Field of Classification Search
CPC .............................. H04B 7/04013; H01Q 3/02
See application file for complete search history.

(56) References Cited

U.S. PATENT DOCUMENTS

2024/0413886 A1*  12/2024  Yoshioka .............. H04W 16/28
2024/0421854 A1*  12/2024  Jeong ....................... H01Q 3/44

* cited by examiner

*Primary Examiner* — Sung S Ahn
(74) *Attorney, Agent, or Firm* — Muncy, Geissler, Olds & Lowe, P.C.

(57) ABSTRACT

A system and a method for automatically adjusting a beam direction of a reflector are provided. The system includes: a reflector for reflecting, refracting, or transmitting incident waves of network signals to a specified area; a database, storing optimized setting combinations for specified areas that include an altitude of the reflector and angles thereof with respect to the specified area, making signals of the specified area have maximum intensity; a communication module, receiving a trigger signal; a computing and processing module, retrieving from the optimized setting combination for the specified area according to the area name of the trigger signal; and a control module, adjusting the altitude and angles of the reflector according to the optimized setting combination. The disclosure can automatically detect a specified area needing network service and automatically adjust the reflector for signal intensity enhancement.

18 Claims, 7 Drawing Sheets

SYSTEM AND METHOD FOR AUTOMATICALLY ADJUSTING BEAM DIRECTION OF REFLECTOR

This application claims priority for the TW patent application No. 113104537 filed on 5 Feb. 2024, the content of which is incorporated by reference in its entirely.

BACKGROUND OF THE INVENTION

Field of the Invention

The present invention relates to a wireless communication technology, particularly to a system and a method for automatically adjusting a beam direction of a reflector.

Description of the Prior Art

Because of scarcity of frequency spectra and demand for high transmission rate, it is expected that 6G wireless communication will advance to the field of Tetrahertz (Thz) and sub-Tetrahertz. Once the related technologies are successfully developed, the data transmission rate of 6G will be 10-100 times higher than that of 5G, i.e., up to 100 Gps or even more than 1 Tbps. However, due to the poor diffractive capability, Thz signals from base stations are likely to be blocked by barriers such as walls.

A reflector plate made from a material capable of arbitrarily shaping the electromagnetic wavefront can be adapted or altered to the radio signal between the transmitter and the receiver. In such way, capacity and coverage of a communication network may be enhanced via deploying the reflector without additional base stations depending on the required flow rate and the communication features. However, in case of function abnormality of the reflector, the clients or the maintenance engineers must test and adjust the reflector on site, such as the altitude, the aspect angle, the elevation angle, the tilt angle, etc. For those reflectors installed on the top or external wall of a building, the reflectors need to be adjusted one by one, which is difficult and inconvenient.

SUMMARY OF THE INVENTION

Accordingly, the present invention proposes a system for automatically adjusting a beam direction of a reflector and a method thereof to overcome the conventional problems and meet the future requirements. The architecture and embodiments of the present invention will be described in detail below.

An objective of the present invention is to provide a system for automatically adjusting a beam direction of a reflector and a method thereof, wherein a reflector, whose altitude and angles are adjustable, is used to reflect the incident waves of the network signals to a specified area where the original signals are weak or null, and wherein the altitude and angles are in an optimized setting combination that have been set in advance. As long as sensors or personnel enter the specified area, the altitude and angles of the reflector may be automatically adjusted according to the optimized setting combination, whereby the signals are enhanced in the specified area.

Another objective of the present invention is to provide a system for automatically adjusting the beam direction of a reflector and a method thereof, wherein while signals are found to be weak or abnormal in a specified area, the users or maintenance engineers may use a signal transmitter in the specified area to adjust the reflector to an optimized setting combination merely via pressing one button, whereby the users or maintenance engineers may perform far-end control to restore the reflector of the specified area to the optimized setting combination.

In order to achieve the abovementioned objectives, the present invention provides a system for automatically adjusting the beam direction of a reflector. The system includes: a reflector, used to reflect, refract, or transmit the incident waves of network signals to at least one of a plurality of specified areas; a database, storing optimized setting combinations respectively for the specified areas, wherein the optimized setting combination includes the altitude of the reflector and the angles of the reflector with respect to the specified area, which make the signals of the specified area have maximum intensity; a communication module, receiving a trigger signal, wherein the trigger signal includes the area name of one of the specified areas; a computing and processing module, connected with the communication module and the database, receiving the trigger signal, retrieving from the database the optimized setting combination for the specified area according to the area name of the trigger signal, and transmitting the optimized setting combination; and a control module, connected with the computing and processing module and the reflector, receiving the optimized setting combination, and adjusting the altitude and angles of the reflector according to the optimized setting combination.

In one embodiment, the disclosure further includes a plurality of sensors, which are respectively disposed in different specified areas. While the sensor detects that at least one user enters one of the specified areas, the sensor actively transmits the trigger signal to the communication module.

In one embodiment, the sensors include be at least one of monitors, Bluetooth sensors, ZigBee sensors, ultra-wideband (UWB) sensors, WIFI sensors, infrared sensors, ultrasonic sensor, millimeter-wave sensors, IoT light sensors, and security sensors.

In one embodiment, the disclosure further includes a plurality of signal transmitters, which are respectively disposed in specified areas. While one user enters one of the specified areas, the signal transmitter in the specified area is activated to transmit the trigger signal to the communication module.

In one embodiment, while the communication module receives an optimization request from the sensor in the specified area, the computing and processing module controls the control module to adjust the altitude and angle of the reflector in response to the optimization request to make the reflector scan the area at different altitudes and different angles. At the same time, the sensor persistently measures signal intensity and persistently transmits a corresponding signal reference value to the communication module. The computing and processing module calculates the optimized setting combination for each specified area according to the signal reference values.

In one embodiment, the angles include the azimuth angle and elevation angle of the reflector.

In one embodiment, the communication module is connected with a rear-end controller for receiving a remote-control instruction; the computing and processing module controls the control module to adjust the altitude and angles of the reflector in response to the remote-control instruction.

In one embodiment, the optimized setting combination includes an angular signal coverage, which avoids a shielded area.

The disclosure also provides a method for automatically adjusting the beam direction of a reflector, which applies to a system for automatically adjusting the beam direction of a reflector. The method includes steps: working out the optimized setting combination for each of a plurality of specified areas and storing the optimized setting combinations in a database, wherein the optimized setting combination includes an altitude of the reflector and angles of the reflector with respect to the specified area, which make signals of the specified area have maximum intensity; receiving, by a communication module, a trigger signal, wherein the trigger signal includes an area name of one of the specified areas; receiving, by a computing and processing module, the trigger signal, and retrieving from the database the optimized setting combination of the specified area according to the area name of the trigger signal, and transmitting the optimized setting combination to a control module; and adjusting, by the control module, the altitude and angles of the reflector according to the optimized setting combination to make the reflector reflect, refract, or transmit the incident wave of the network signal to the specified area according to the area name.

In one embodiment, the method of working out the optimized setting combination for each of the plurality of specified areas includes steps: initiating optimization request by sensor disposed in one of the specified area; after the communication module receives the optimization request, controlling, by the computing and processing module, the control module to adjust the altitude and angles of the reflector in response to the optimization request to make the reflector perform area scanning operations at different altitudes and different angles; by the sensor, persistently measuring signal intensities and persistently transmitting corresponding signal reference values to the communication module; according to the signal reference values that the sensor measures at different altitudes and different angles, working out, by the computing and processing module, the optimized setting combination for each specified area.

In one embodiment, after having measured all the signal intensities generated by the reflector at different altitudes and different angles, further transmitting, by the sensor, a response of measurement completion to the communication module.

In one embodiment, the control module is configured to perform the steps: controlling the reflector to perform area scanning operations for one of the specified areas in a large angular range; selecting a large-range optimized setting combination having maximum intensity when signal intensity measurement for a large range of angles is completed; controlling the reflector to perform the area scanning operations in a small angular range, which is smaller than the large angular range and the small angular range is within the large angular range, to find out a small-range optimized setting combination having maximum intensity when signal intensity measurement for a small range of angles is completed; and using the small-range optimized setting combination as the optimized setting combination for the specified area.

DETAILED DESCRIPTION OF THE INVENTION

The technical schemes of the embodiments of the present invention will be described clearly and fully in cooperation with the attached drawings. Obviously, the embodiments described in the specification are not all the embodiments of the present invention but only a portion of the embodiments of the present invention.

It should be understood: the terms "comprise" and "include" used in the specification and claims only indicate the existence of characteristics, entireties, steps, operations, elements and/or components but do not exclude the existence or addition of one or more other characteristics, entireties, steps, operations, elements and/or components.

It should be also understood: the terms used in the specification of the present invention are only to describe specified embodiments but not to limit the scope of the present invention. While used in the specification and claims of the present invention, the singular noun, which is described by "one", "one piece of" or "the", implies the plural form thereof unless the context indicates another condition clearly.

It should be further understood: the term "and/or" used in the specification and claims of the present invention refers to one or several of the listed items or any possible combination of the listed items, and the present invention includes these combinations.

Figure 1:
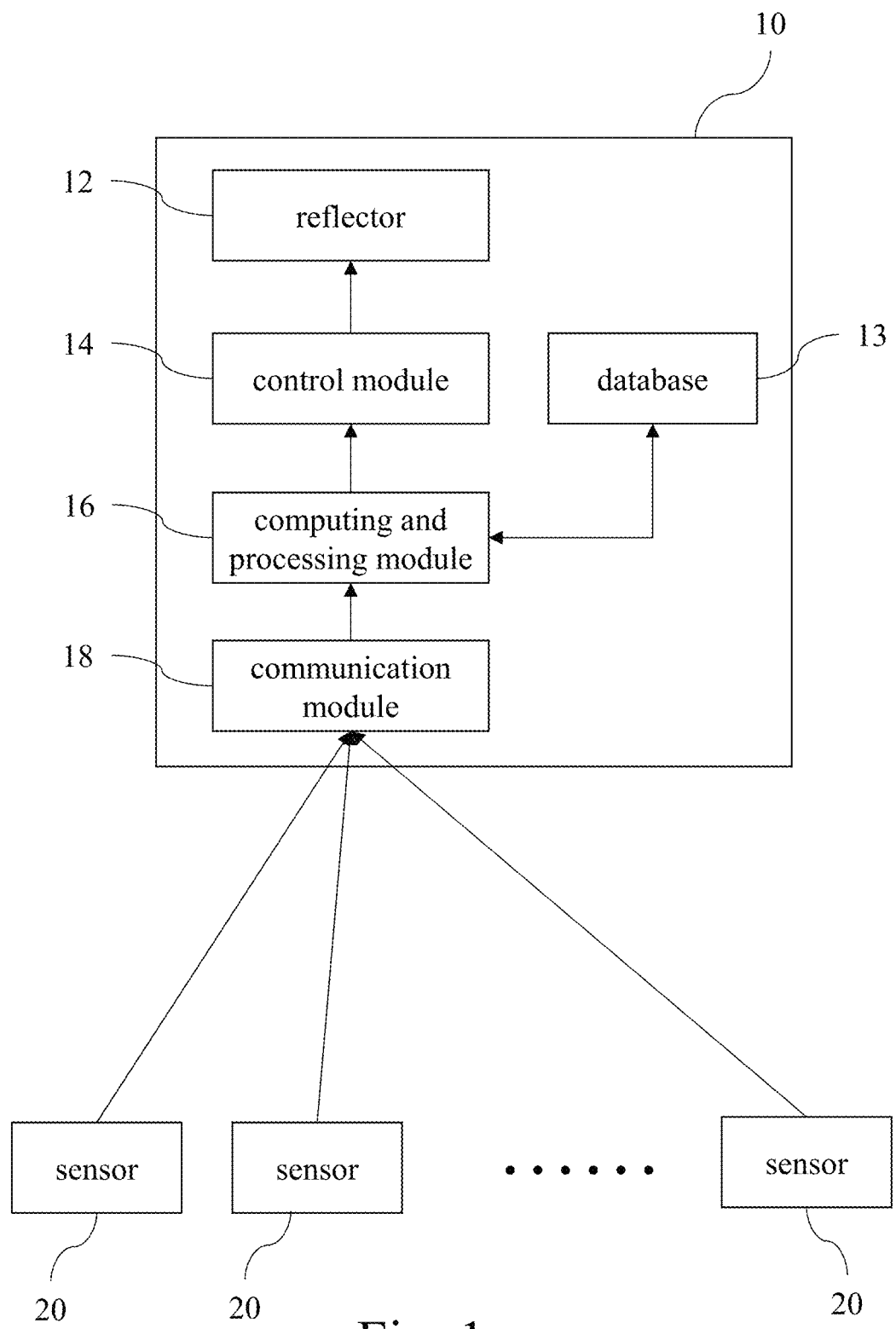
FIG. 1 is a block diagram schematically showing a system for automatically adjusting the beam direction of a reflector according to one embodiment of the present invention.

The present invention provides a system for automatically adjusting the beam direction of a reflector and a method thereof. Refer to FIG. 1. FIG. 1 is a block diagram schematically showing a system for automatically adjusting the beam direction of a reflector according to one embodiment of the present invention. The system 10 for automatically adjusting the beam direction of a reflector of the present invention may be disposed on the top of a building or the ceiling of top floor, so as to reflect the network signals to specified spaces, such as a room where the network signals are weak or even null. The system 10 for automatically adjusting the beam direction of a reflector includes a reflector 12, a database 13, a control module 14, a computing and processing module 16, and a communication module 18. The reflector 12 is connected with the control module 14. The database 13 and the control module 14 are connected with the computing and processing module 16. The computing and processing module 16 is connected with the communication module 18.

The reflector 12 can be made from a material capable of reflecting electromagnetic waves and used to reflect, refract, or transmit the incident waves of network signals to specified areas. The database 13 stores optimized setting combinations for a plurality of specified areas. The optimized setting combination includes an altitude and angles (with respect to a specified area) of the reflector 12, which are a combination of optimized parameters worked out beforehand to make the specified area have the maximum signal intensity. The method of working out the optimized setting combination will be described hereinafter. The communication module 18 is a wired or wireless signal transmission interface and connected with an external device such as a sensor 20, to receive a trigger signal emitted by the external device. The trigger signal includes an area name corresponding to a specified area. The computing and processing module 16 is a processor or a computing device. After receiving the trigger signal, the computing and processing module 16 retrieves from the database 13 the optimized setting combination of a specified area according to the area name of the trigger signal. The control module 14 is a controller, electrically connected with a lift table (not shown in the drawings) and a rotation mechanism (not shown in the drawings). After receiving the optimized setting combination transmitted by the computing and processing module 16, the control module 14 adjusts the altitude and angles of the reflector 12 according to the optimized setting combination. Specifically, the control module 14 controls the lift table to adjust the altitude of the reflector 12 and controls the rotation mechanism to adjust the angles of the reflector 12, including the azimuth angle and elevation angle.

Figure 2:
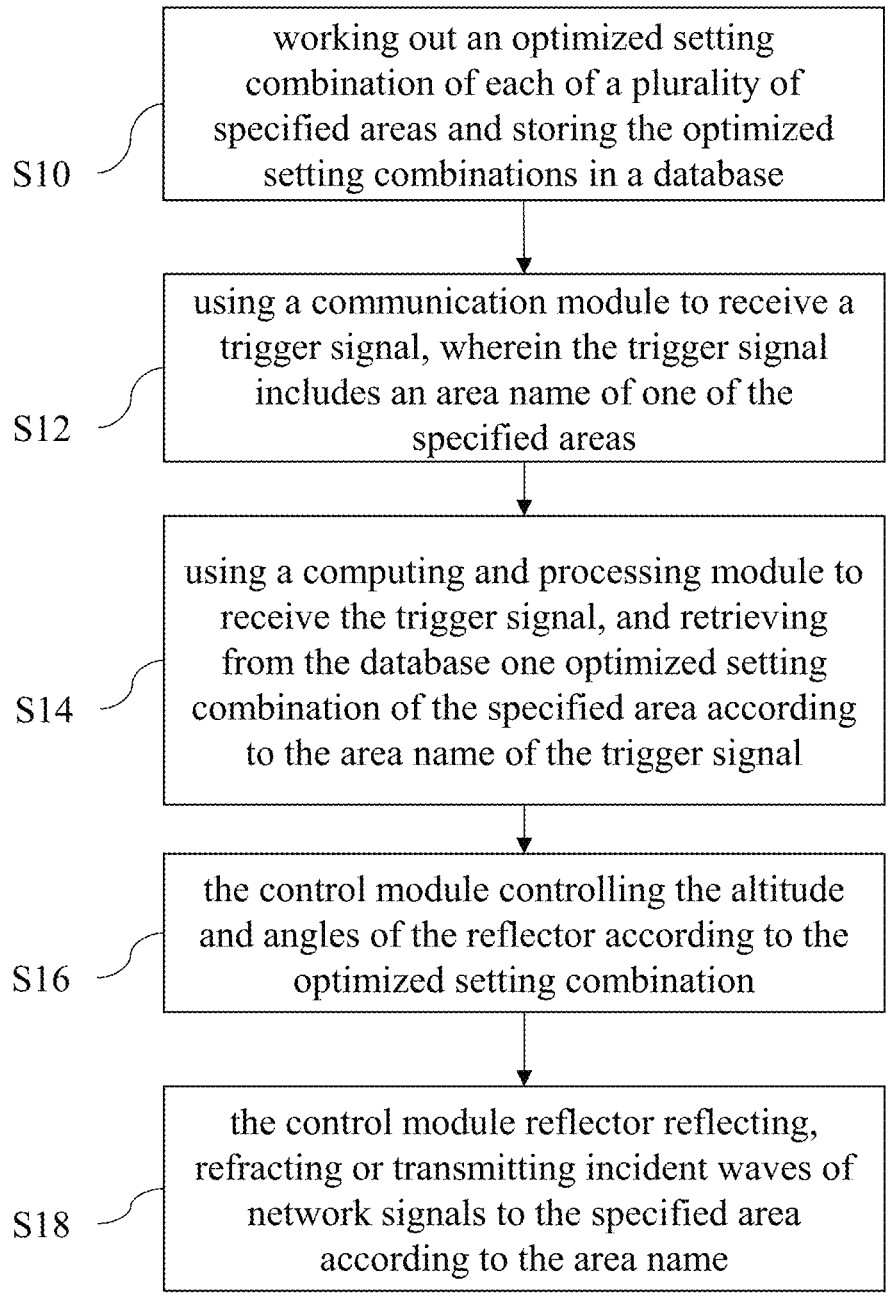
FIG. 2 is a flowchart showing a method for automatically adjusting the beam direction of a reflector according to one embodiment of the present invention.

Refer to FIG. 2. FIG. 2 is a flowchart showing a method for automatically adjusting the beam direction of a reflector according to one embodiment of the present invention. In Step S10, the optimized setting combination of each of a plurality of specified areas is worked out and stored in a database 13, wherein the optimized setting combination includes an altitude of a reflector 12 and angles (with respect to a specified area) of the reflector 12, which can maximize the signal intensity of the specified area. In Step S12, a communication module 18 is used to receive a trigger signal, wherein the trigger signal includes an area name corresponding to one of the specified areas. In Step S14, after the communication module 18 transmits the trigger signal to a computing and processing module 16, the computing and processing module 16 receives the trigger signal and retrieves from the database 13 the optimized setting combination corresponding to the area name of the trigger signal and transmits the optimized setting combination to a control module 14. In Step S16, the control module 14 adjusts the altitude and angles of the reflector 12 according to the optimized setting combination. In Step S18, the reflector 12 reflects, refracts, or transmits the incident waves of the network signals to the specified area according to the area name.

Figure 3:
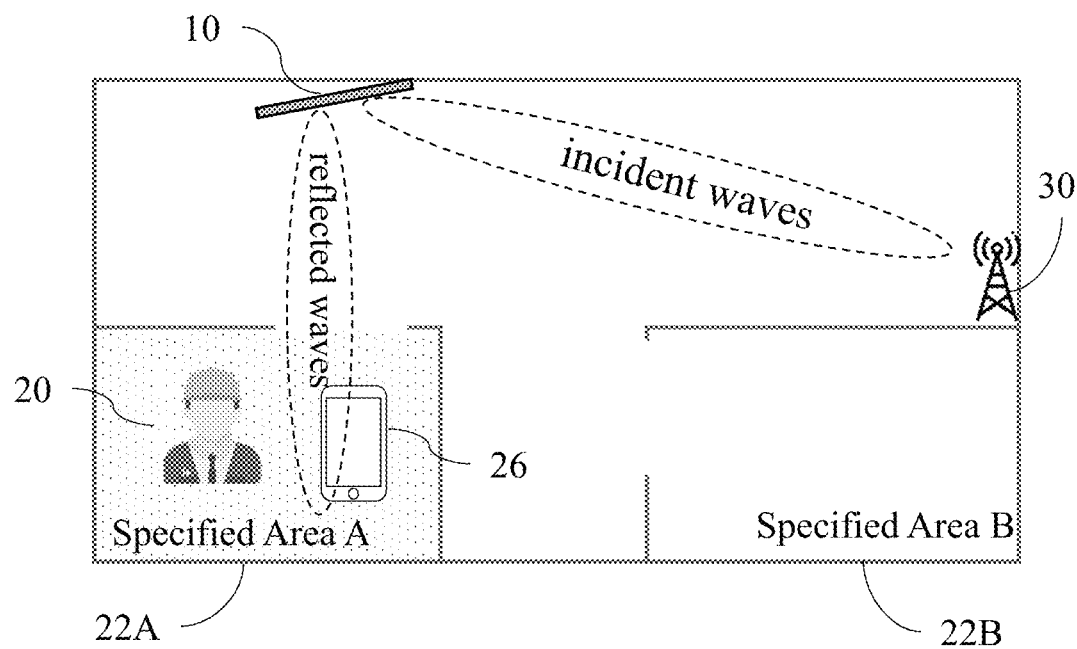
FIG. 3 and FIG. 4 are diagrams schematically showing a system for automatically adjusting the beam direction of a reflector according to embodiments of the present invention.
Figure 4:
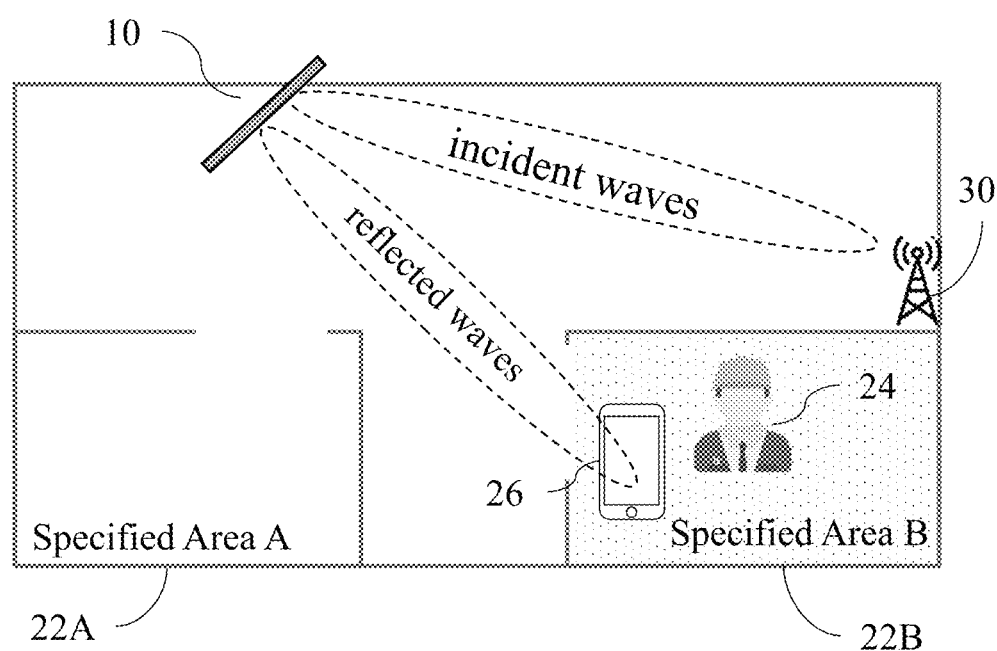

Refer to FIG. 3 and FIG. 4. FIG. 3 and FIG. 4 are diagrams schematically showing the system 10 for automatically adjusting the beam direction of a reflector according to embodiments of the present invention. As shown in the drawings, if the signal emitted by a base station 30 is blocked by the wall, the users 24 in Specified Area A 22A and Specified Area B 22B will perceive that the transmission ability of the network is inferior or even zero. In such a case, the system 10 for automatically adjusting the beam direction of a reflector of the present invention may be used to reflect the incident waves to Specified Area A 22A or Specified Area B 22B. In the case shown in FIG. 3, suppose that the user 24 is in Specified Area A 22A and that the area name of Specified Area A 22A is "ROOM A". The trigger signal, which is emitted from Specified Area A 22A to the communication module 18, includes the area name "ROOM A". After receiving the trigger signal, the system 10 for automatically adjusting the beam direction of a reflector retrieves Specified Area A 22A and the corresponding optimized setting combination according to the area name "ROOM A" from database 13. Then, the system 10 for automatically adjusting the beam direction of a reflector adjusts the altitude, the azimuth angle, and the elevation angle of the reflector 12 according to the optimized setting combination. Suppose that the user 24 moves to Specified Area B 22B and that the area name of Specified Area B 22B is "ROOM B". The trigger signal, which is emitted from Specified Area B 22B to the communication module 18, includes the area name "ROOM B". After receiving the trigger signal, the system 10 for automatically adjusting the beam direction of a reflector retrieves Specified Area B 22B and the corresponding optimized setting combination according to the area name "ROOM B" from database 13. Then, the system 10 for automatically adjusting the beam direction of a reflector adjusts the altitude, the azimuth angle, and the elevation angle of the reflector 12 according to the optimized setting combination.

Figure 5:
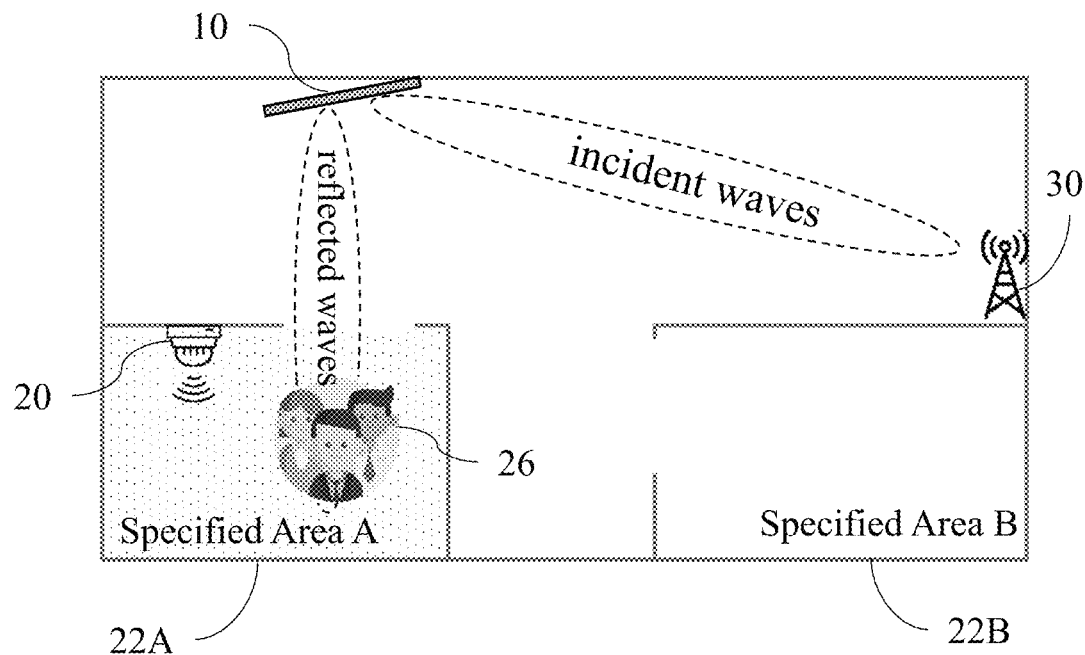
FIG. 5 is a diagram schematically showing a system for automatically adjusting the beam direction of a reflector according to another embodiment of the present invention.
Figure 6:
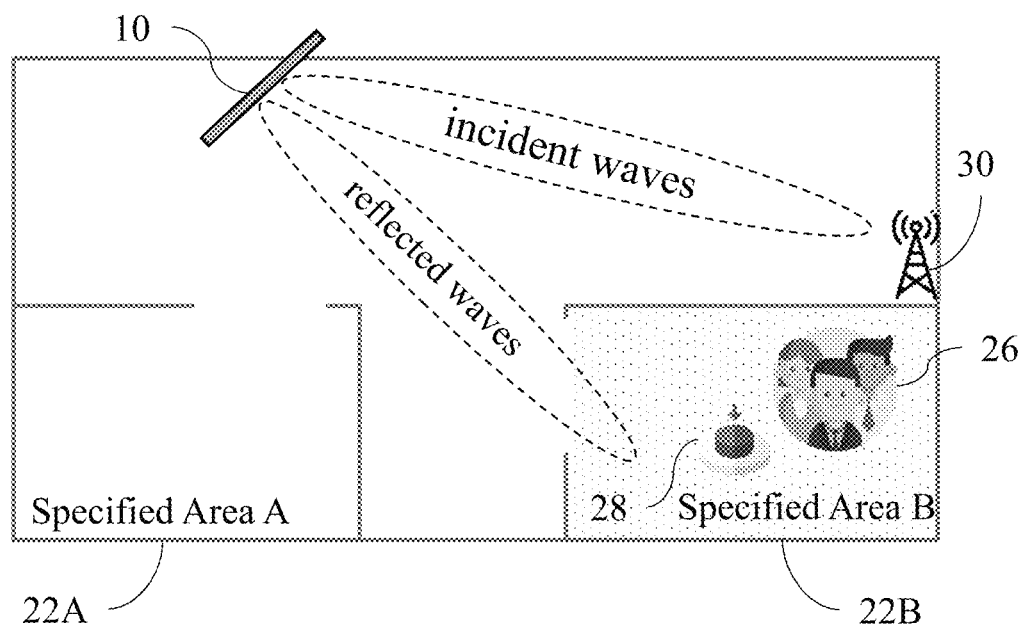
FIG. 6 is a diagram schematically showing a system for automatically adjusting the beam direction of a reflector according to yet another embodiment of the present invention.

In some embodiments, the transmission of the trigger signal includes at least two modes. In one of trigger signal transmission mode, each specified area is equipped with a sensor. As shown in FIG. 5, Specified Area A 22A is equipped with at least on sensor 20, which may be at least one of monitors, Bluetooth sensors, ZigBee sensors, UWB sensors, WIFI sensors, infrared sensors, ultrasonic sensor, millimeter-wave sensors, IT light sensors, and security sensors. For example, an IoT appliance is integrated with sensing elements and thus includes the sensor 20. While detecting that at least one user 24 enters Specified Area A 22A, the sensor 20 actively transmits the trigger signal to the communication module 18. Finally, the altitude, the azimuth angle, and the elevation angle of the reflector 12 are adjusted to the positions most suitable for Specified Area A 22A, whereby the signal in Specified Area A 22A has the optimized intensity. Refer to FIG. 6. FIG. 6 is a diagram schematically showing another trigger signal transmission mode, wherein each specified area is equipped with a signal transmitter 28. While detecting that at least one user 24 enters Specified Area B 22B, the signal transmitter 28 is activated (for example, the user 24 presses the button of the signal transmitter 28) to transmit the trigger signal to the communication module 18. Then, the altitude, the azimuth angle, and the elevation angle of the reflector 12 are adjusted to the positions most suitable for Specified Area B 22B.

Figure 7:
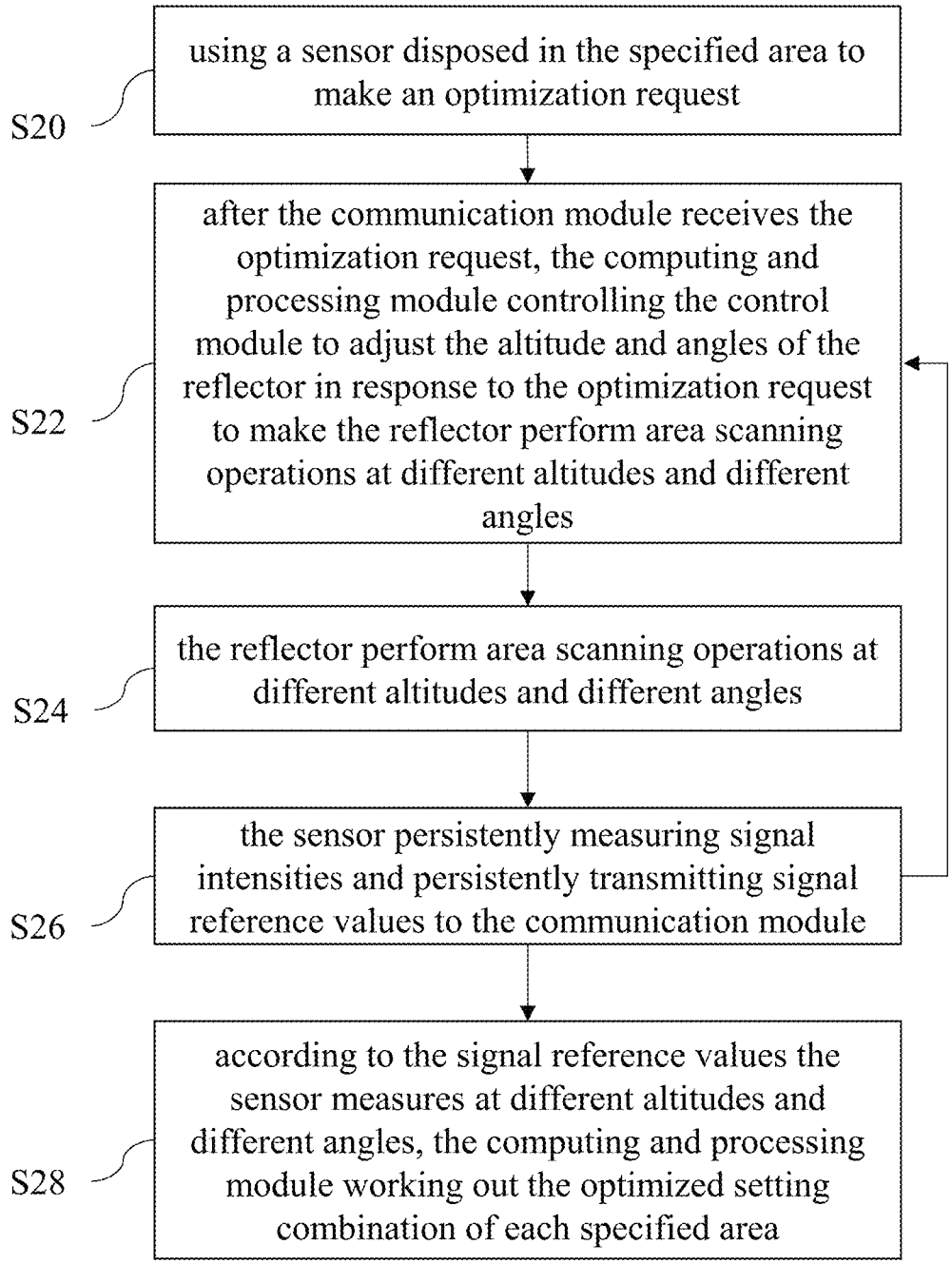
FIG. 7 is a flowchart of a method of working out the optimized setting combination of each specified area according to one embodiment of the present invention.

Refer to FIG. 7. FIG. 7 is a flowchart of the method of working out the optimized setting combination of each specified area. In Step S20, use the sensor 20, which is disposed in a specified area, to initiate and send out an optimization request. In Step S22, after the communication module 18 receives the optimization request, the computing and processing module 16 controls the control module 14 to adjust the altitude and angles of the reflector 12 in response to the optimization request. In Step S24, the reflector 12 performs area scanning operations at different altitudes and different angles. In Step S26, the sensor 20 persistently measures signal intensities and persistently transmits corresponding signal reference values to the communication module 18. Suppose that the coverage of signals spans an angular range of 60 degrees, two altitudes can be assigned to the reflector 12; thus, there are totally 72 groups of parameter settings needing area scanning. In Step S28, after the sensor 20 completes the area scanning operations, the computing and processing module 16 works out the optimized setting combination for each specified area according to the signal reference values (the sensor 20 measures and transmit while the reflector 12 is at different altitudes and different angles).

The signal reference values includes Received Signal Strength Indicator (RSSI), Reference Signal Receiving Power (RSRP), Reference Signal Receiving Quality (RSRQ), Signal-to-Noise Ratio (SNR), Signal to Interference plus Noise Ratio (SINR), Bit Error Ratio, BER), Packet Error Ratio (PER), Packet Delivery Ratio (PDR), latency, jitter, packet loss, and throughput.

Figure 8:
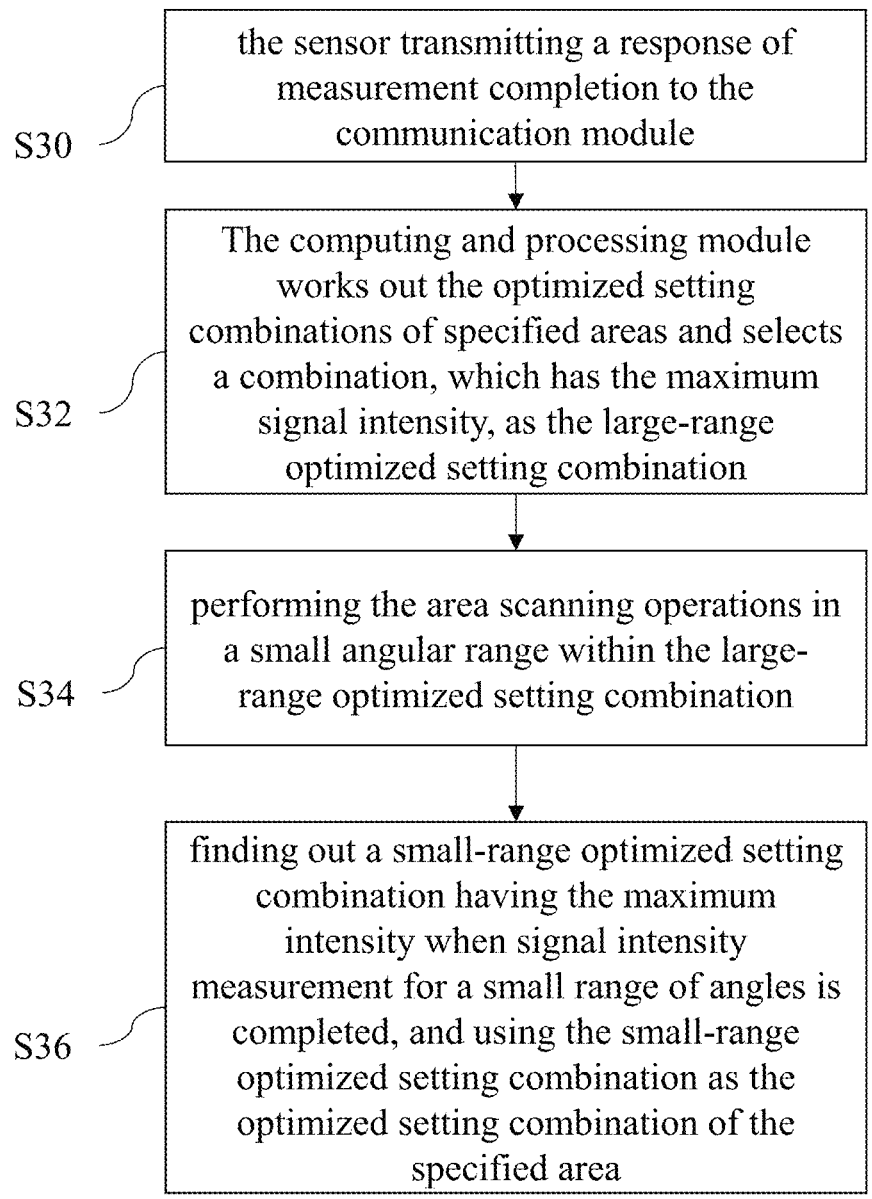
FIG. 8 is a flowchart of a method of further calculating the optimized setting combination for each specified area according to one embodiment of the present invention.

While the area scanning range is set to be 60 degrees, the precision is still insufficient. Therefore, the area scanning range should be further decreased. Refer to FIG. 8. In Step S30, the sensor 20 transmits a response of measurement completion to the communication module 18. In Step S32, the computing and processing module 16 works out the optimized setting combinations of specified areas and selects a combination, which has the maximum signal intensity, as the large-range optimized setting combination. In Step S34, the coverage of the area scanning signal is reduced, wherein the control module 14 adjusts the reflector 12 to perform the area scanning operations in a small angular range, which is within the large angular range and smaller than the large angular range; for example, in an angular range of 30 degrees. In Step S36, the system finds out a small-range optimized setting combination within the large-range optimized setting combination and directly uses the small-range optimized setting combination as the optimized setting combination of the specified area. Alternatively, the area scanning range may be further reduced to a smaller angle; for example, the system performs local scanning operations in an angular range of 15 degrees, to enhance the setting precision. After the optimized setting combination is settled, the engineer may enter the area name of the specified area to the database 13 from a far end.

According to the numbers of persons or devices (such as the mobile devices 26 in FIG. 3 and FIG. 4), or the requirement of resource blocks, the computing and processing module 16 will determine whether a specified area needs a service: adjusting the reflector 12 to make the area be covered by signals. The computing and processing module 16 calculates the F values of all areas and selects the maximum F value. If $F_A$ is the maximum value, it indicates that Specified Area A 22A needs signal service. Then, the computing and processing module 16 retrieves from the database the optimized setting combination A best for adjusting the reflector 12. $F_A$ is calculated according to the equation shown below:

$$F_A = \alpha\left(\frac{1}{X}x_A\right) + \beta\left(\frac{1}{Y}y_A\right) + \varepsilon\left(\frac{1}{Z}z_A\right)$$

wherein $F_A$ is the usage quantity function of Area A; $F_B$ is the quantity usage function of Area B, and so on; similarly, $F_Z$ is the usage quantity function of Area Z; $\alpha$ is the weight parameter of the people count; $\beta$ is the weight parameter of resource blocks; $\varepsilon$ is the weight parameter of the device count; $\alpha+\beta+\varepsilon=1$; $x_A$ is the people count of Area A; X is the sum of the people counts of all the areas, i.e. $x_A+x_B+\ldots+x_Z$; $y_A$ is the resource block of Specified Area A; Y is the sum of the resource blocks of all the areas, i.e. $y_A+y_B+\ldots+y_Z$; $z_A$ is the device count of area A; Z is the sum of the device counts of all the areas, i.e. $z_A+z_B+\ldots+z_Z$. Find out the maximum value of F. If $F_A$ of Specified Area A is the maximum value, $A^{best}$ is adjusted to provide service for the devices and users in Specified Area A. If $F_B$ of Specified Area B is the maximum value, $B^{best}$ is adjusted to provide service for the devices and users in Specified Area B.

Figure 9:
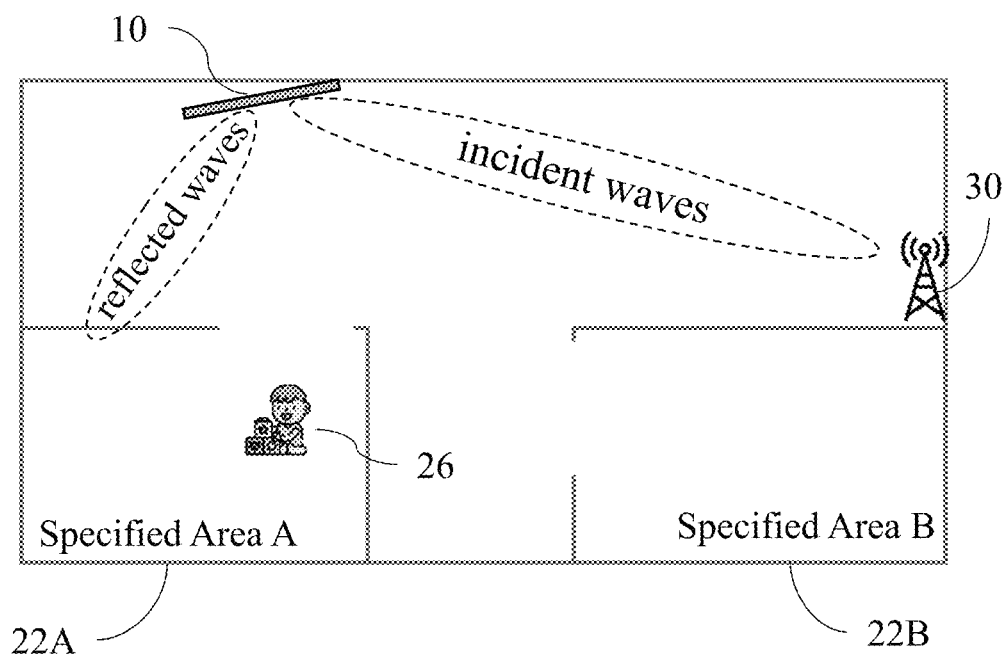
FIG. 9 is a diagram schematically showing that a reflector is used to make the reflected wave avoid a shielded area according to one embodiment of the present invention.

Refer to FIG. 9 for another embodiment of the present invention. In some cases, a space free of network signals is required. For example, a playroom should be free of signals lest electromagnetic waves harm children; a conference room free of signals can prevent from information leakage. Thus, the present invention may vary the angles of a reflector to generate a shielded area where no signal appears. Therefore, the optimized setting combination may include an angular coverage that avoids a shielded area. Suppose that Specified Area A 22A is a playroom and the user 24 is a child. The altitude and angles of the reflector 12 may make the reflected waves completely avoid Specified Area A 22A, whereby Specified Area A 22A becomes a signal-free space.

In the present invention, the system 10 for automatically adjusting the beam direction of a reflector can actively detect whether the current state of the reflector is normal. Once the engineer receives a complaint made by a customer or abnormal information reported by the system, the engineer can adjust the setting combination of the reflector 12 from a far end. Alternatively, according to the processes shown in FIG. 7 and FIG. 8, the engineer performs area scanning operations from a far end to obtain the newest and best setting combination and then update the optimized setting combination of the abnormal area.

In conclusion, the present invention provides a system and method for automatically adjusting the beam direction of a reflector, which enables the user to optimize the setting combination of the reflector via a one-button operation and records the optimized setting combinations of different situations. Further, can feed back the entrance information of an area from a room through sensors for setting adjustment. Furthermore, the present invention enables the client or maintenance engineer to control and recover the optimized setting combination in a wireless or wired way from a far end via a one-button operation. Moreover, the present invention emits an alert while the device is abnormal.

The embodiments described above are only to exemplify the present invention but not to limit the scope of the present invention. The embodiments involving equivalent replacement or variation made easily according to the technical contents disclosed by the specification or claims are to be also included by the scope of the present invention.

What is claimed is:

1. A system for automatically adjusting a beam direction of a reflector, the system comprising:
    the reflector, used to reflect, refract, or transmit incident waves of network signals to at least one of a plurality of specified areas;
    a database, storing optimized setting combinations respectively for the plurality of specified areas, wherein the optimized setting combination comprises an altitude of the reflector and angles of the reflector with respect to the specified area, which make signals of the specified area have maximum intensity;
    a communication module, receiving a trigger signal, wherein the trigger signal comprises an area name of one of the specified areas;
    a computing and processing module, connected with the communication module and the database, the computing and processing module receiving the trigger signal, retrieving from the database the optimized setting combination of the specified area according to the area name of the trigger signal, and transmitting the optimized setting combination; and
a control module, connected with the computing and processing module and the reflector, the control module receiving the optimized setting combination sent out by the computing and processing module, and adjusting the altitude and the angles of the reflector according to the optimized setting combination.

2. The system for automatically adjusting the beam direction of a reflector according to claim 1, further comprising a plurality of sensors, which are respectively disposed in the plurality of specified areas, the plurality of sensors actively transmitting the trigger signal to the communication module while detecting that at least one user enters one of the plurality of specified areas.

3. The system for automatically adjusting the beam direction of a reflector according to claim 2, wherein the plurality of sensors comprises at least one of monitors, Bluetooth sensors, ZigBee sensors, ultra-wideband (UWB) sensors, WIFI sensors, infrared sensors, ultrasonic sensor, millimeter-wave sensors, IoT light sensors, and security sensors.

4. The system for automatically adjusting the beam direction of a reflector according to claim 1, further comprising a plurality of signal transmitters, which are respectively disposed in the plurality of specified areas, wherein while one user enters one of the specified areas, the signal transmitter in the specified area is activated to transmit the trigger signal to the communication module.

5. The system for automatically adjusting the beam direction of a reflector according to claim 1, wherein:
while the communication module receives an optimization request from the sensor in one of the plurality of specified areas, the computing and processing module controls the control module to adjust the altitude and the angles of the reflector in response to the optimization request to make the reflector perform area scan operations at different altitudes and different angles;
while the area scanning operations are being performed, the sensor persistently measures signal intensity and persistently transmits signal reference values corresponding to the signal intensity to the communication module;
the computing and processing module calculates the optimized setting combination for each of the specified areas according to the signal reference values.

6. The system for automatically adjusting the beam direction of a reflector according to claim 1, wherein the angles comprise an azimuth angle and an elevation angle of the reflector.

7. The system for automatically adjusting the beam direction of a reflector according to claim 1, wherein the communication module is further in signal communication with a rear-end controller for receiving a remote-control instruction; the computing and processing module controls the control module to adjust the altitude and the angles of the reflector in response to the remote-control instruction.

8. The system for automatically adjusting the beam direction of a reflector according to claim 1, wherein the optimized setting combination comprises an angular coverage, which avoids a shielded area.

9. A method for automatically adjusting a beam direction of a reflector, which is applied to a system for automatically adjusting the beam direction of the reflector, comprising steps:
working out an optimized setting combination for each of a plurality of specified areas and storing the optimized setting combinations in a database, wherein the optimized setting combination comprises an altitude of the reflector and angles of the reflector with respect to the specified area, which make signals of the specified area have maximum intensity;
receiving a trigger signal, by a communication module, wherein the trigger signal includes an area name of one of the specified areas;
receiving the trigger signal, by a computing and processing module, retrieving from the database the optimized setting combination for the specified area according to the area name of the trigger signal, and transmitting the optimized setting combination to a control module; and
adjusting the altitude and the angles of the reflector, by the control module, according to the optimized setting combination to make the reflector reflect, refract, or transmit incident waves of network signals to the specified area according to the area name.

10. The method for automatically adjusting the beam direction of a reflector according to claim 9, further comprising: actively transmitting the trigger signal to the communication module while at least one user entering one of the plurality of specified areas is detected, by plurality of sensors that are respectively disposed in the plurality of specified areas.

11. The method for automatically adjusting the beam direction of a reflector according to claim 10, wherein the plurality of sensors comprise at least one of monitors, Bluetooth sensors, ZigBee sensors, UWB sensors, WIFI sensors, infrared sensors, ultrasonic sensor, millimeter-wave sensors, IoT light sensors, and security sensors.

12. The method for automatically adjusting the beam direction of a reflector according to claim 10, further comprising: activating one of a plurality of signal transmitters, which are respectively disposed in the plurality of specified areas, to transmit the trigger signal to the communication module while a user enters one of the specified areas.

13. The method for automatically adjusting the beam direction of a reflector according to claim 9, wherein the step of working out the optimized setting combination for each of the plurality of specified areas comprises steps:
initiating an optimization request, by using a sensor disposed in one of the specified areas;
adjusting, by controlling the control module with the computing and processing module, the altitude and the angles of the reflector in response to the optimization request after the communication module receiving the optimization request, making the reflector perform area scanning operations at different altitudes and different angles;
persistently measuring signal intensity and persistently transmitting signal reference values corresponding the signal intensity, by the sensor, to the communication module;
working out, by the computing and processing module, the optimized setting combination for each of the plurality of the specified area according to the signal reference values.

14. The method for automatically adjusting the beam direction of a reflector according to claim 13, further comprising: transmitting, by the sensor, a response of measurement completion to the communication module after measuring signal intensity for the reflector at different altitudes and different angles.

15. The method for automatically adjusting the beam direction of a reflector according to claim 13, wherein the control module is configured to perform the steps:
- controlling the reflector to perform the area scanning operation for one of the specified areas in a large angular range;
- selecting a large-range optimized setting combination having maximum intensity when signal intensity measurement for a large range of angles is completed;
- controlling the reflector to perform the area scanning operations in a small angular range, which is smaller than the large angular range and the small angular range is within the large angular range, to find out a small-range optimized setting combination having maximum intensity when signal intensity measurement for a small range of angles is completed; and
- using the small-range optimized setting combination as the optimized setting combination for the specified area.

16. The method for automatically adjusting the beam direction of a reflector according to claim 9, wherein the angles comprises an azimuth angle and an elevation angle of the reflector.

17. The method for automatically adjusting the beam direction of a reflector according to claim 9, wherein the communication module is further in signal communication with a rear-end controller for receiving a remote-control instruction; the computing and processing module controls the control module to adjust the altitude and the angles of the reflector in response to the remote-control instruction.

18. The method for automatically adjusting the beam direction of a reflector according to claim 9, wherein the optimized setting combination comprises an angular coverage, which avoids a shielded area.

* * * * *